Oct. 2, 1962 — L. B. GRIFFITH — 3,056,749
SPRAY DEVICE TO ELIMINATE FOAM
Filed Sept. 12, 1957
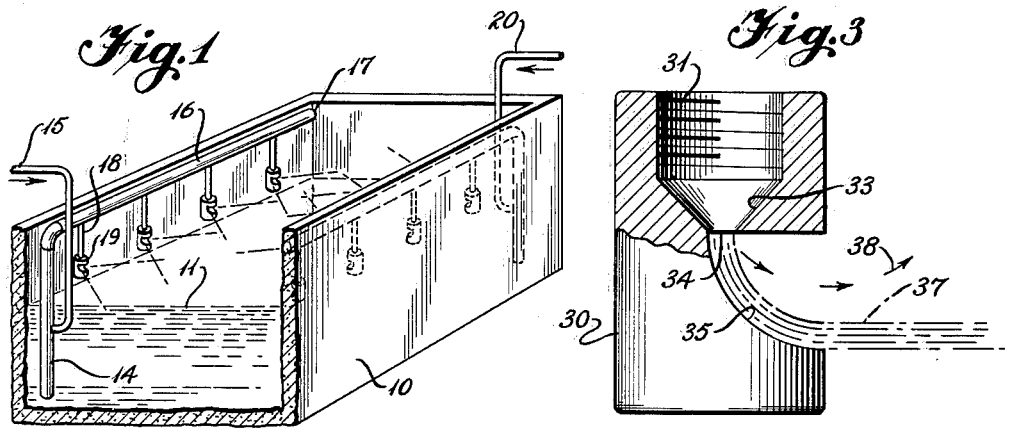
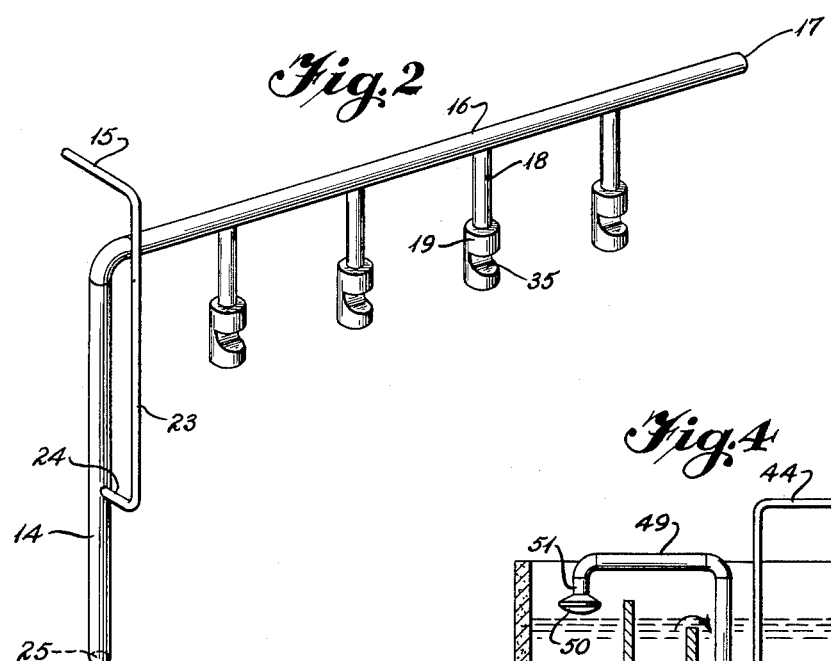
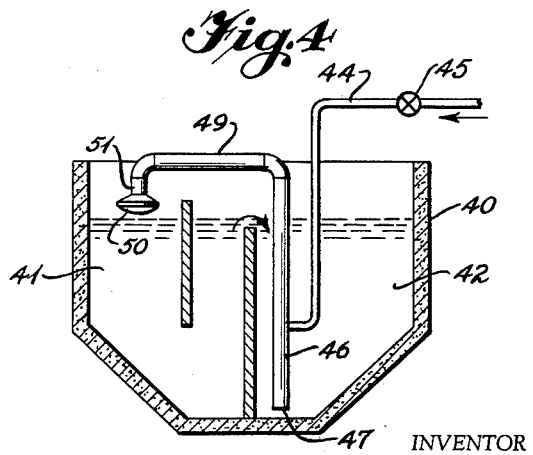
INVENTOR
Llewellyn B. Griffith
BY Henry H. Snelling
ATTORNEY

United States Patent Office 3,056,749
Patented Oct. 2, 1962

3,056,749
SPRAY DEVICE TO ELIMINATE FOAM
Llewellyn B. Griffith, 22 S. Edison St., Arlington, Va.
Filed Sept. 12, 1957, Ser. No. 683,502
1 Claim. (Cl. 252—361)

This invention relates to the elimination of foam constituents, particularly foam arising from tanks of sewage treatment plants including aquatic ponds serving as a tertiary or final treatment. The principal object of the invention is to provide a method and apparatus for spraying recirculated liquid from a body of sewage, previously given primary and preferably secondary treatment as well, and discharging the spray to the surface of the body of liquid in such manner as to bring the foam into solution. This requires that the spray preferably be a thin sheet of liquid for while the foam is higly soluble in water, the water must not be atomized or in the form of a mist. The discharge of the liquid as large drops, however, will be satisfactory, particularly if the large drops are discharged with sufficient force to knock down the foam and completely dissolve it.

Another object of the invention is to construct a net of cross sprays which together cover the entire surface area of an aerator tank.

A further object of the invention is to provide an intermittently operating airlift spray which will remove zoogleal slimes from the bottom of a tank of a sewage system and discharge these slimes above and preferably parallel to the liquid surface of a preceding tank of the series, thus simultaneously eliminating the foam and improving the settling of colloidal matter in the tank receiving the slimes.

A still further object of the invention is to add a series of two or more spray nozzles to a pond water circulator such as described in my application, Serial No. 653,797, filed April 19, 1957, to aid in the dissolving of the foam before it has a chance to become airborne.

In the drawings:

FIGURE 1 is a perspective view, partly broken away, of a tank with crisscross sprays;

FIGURE 2 is a perspective of the spray system and a connected airlift;

FIGURE 3 is a vertical section through one form of nozzle; and

FIGURE 4 shows the spray applied to a two-cell sewage tank.

The present day large use of detergents has frequently caused the formation on the surface of bodies of water of a sticky, syrupy foam which is highly objectionable, particularly when it builds up to a height sufficient that the wind may make it airborne. In such cases the foam may travel for great distances and frequently is caught in trees or on other objects. The structures shown in my previously cited patent application nicely eliminate foam from ponds but work still better when the present system of piping is superposed on the curved wall of the casing there illustrated.

There are other ways to eliminate the foam but each has its own definite disadvantages. For example, the anti-foam chemicals not only are relatively costly but more important still they destroy useful biological slimes. Sprinklers other than atomizers do an excellent job but require mechanical pumps which are limited in the distance to which they can pump the water. I have found that the combination of a spray with an airlift gives excellent results particularly when the discharge is for brief periods of a second or so spaced by intervals of up to a few seconds.

A simple form of the invention is shown in FIGURE 1 where a tank 10 having a normal liquid level at 11 is sprayed by two opposed systems, each consisting of an air lift 14 fed by an airpipe 15 and discharging into a horizontal pipe 16 closed as at 17 at its free end. From the horizontal pipe 16 there extend downwardly a number of relatively short vertical pipes 18 each having at its bottom and just above the water level 11 a spray nozzle 19. The particular shape of the spray nozzle may vary within wide limits but I prefer that each of the spray nozzles 19 shall discharge the liquid from the tank in a fan shape, the nozzles on the two sides preferably being staggered so that the entire surface of the tank is covered by the fan spray. The airpipe 20 supplies air to a similar system denoted as a whole by the numeral 21.

The spray assembly is shown in FIG. 2 in greater detail. The airpipe 15 leads from any usual source of air and preferably extends downward as at 23 to the short section 24 discharging into the main upright air lift pipe 14 which as usual is open at its bottom 25. I find a convenient size for both the main airlift pipe 14 and the horizontal pipe 16 to be three inches. The downwardly extending auxiliary pipes 18 may then be one-inch pipes. While the spray nozzles may be of any desired conformation, I find the nozzle illustrated in FIG. 3 to be exceptionally desirable. This nozzle consists of a body 30 tapped as at 31 to have engagement with the pipe 18 and a conical discharge portion 33 leading to a circular hole or port 34, preferably about one-eighth inch in diameter. A curved wall 35, tangent to the flow through port 34, discharges the flowing liquid in a thin layer 37, preferably initially horizontal and therefore parallel to the proximate water level 11. The sheet of liquid 37 discharged is very largely freed of air as the air may readily escape as indicated by the arrows 38. The sheet of water, being fan-shaped in plan view, is quite thin and may, as it fans out, consist merely of separate large drops of water, but care must be taken that a mist is not formed as a mist will not satisfactorily bring the foam into solution in spite of the high solubility of the foam in water.

In FIG. 4 the invention is shown as applied to a two-cell sewage tank 40, cell 41 being an initial cell or tank of the system and cell 42 being a following cell or tank. The airpipe here is numbered 44 and has the usual valve 45, normally time operated, to discharge air into the air lift 46, the open end 47 of which is just short of the bottom 48 of the two-cell tank illustrated. The horizontal pipe corresponding to pipe 16 is numbered 49 and the spray nozzle 50 differs very much from the spray nozzles 19 although discharging a horizontal fan-shaped sheet of liquid. In order to provide for intermittent action the pipe 49 is appreciably higher than it would otherwise be in order to provide room for the descending pipe 51, corresponding to the auxiliary pipes 18.

In all of the forms the discharge is intermittent, as when air is admitted to the pipe 15 or 44, liquid will rise in the main airlift but when this discharges into the horizontal portion of the pipe 16 or 49, the liquid will form at the bottom and the air will rise in the horizontal pipe. The pressure will then increase because of the resistance to flow in the liquid-filled downwardly extending pipes 18 or 51. When the pressure has built up to about five pounds per square inch, a slug of water will be discharged at a very appreciable velocity. The pressure will then drop so that the liquid discharges occur at fairly regular intervals preferably varying anywhere from a single second to three or more seconds.

When used with the circulator described in my previously mentioned pending application, the horizontal pipe 16 is placed just above the circulator shell and the fan-shaped sprays will then knock down the foam and materially facilitate the operation of the water circulator.

What I claim is:

Equipment for use in a body of partially purified sewage containing constituents developed from use of detergents which constituents tend to produce on the surface of the sewage exposed to the atmosphere a light, highly soluble foam which may be blown from said surface by air currents; comprising a horizontal manifold having one end closed and at the other end communicating with a vertical pipe having an open end adapted to be positioned within the body of sewage, an air pipe leading into the vertical pipe near its open end, a plurality of relatively short, spaced vertical pipes of the same length extending downward from the manifold, and a spray nozzle at the bottom of each relatively short pipe positioned at a level between the manifold and the junction of the air pipe, each spray pipe having a conical orifice leading to a curved wall tangent to the flow through the orifice to project a fan-shaped spray in a horizontal direction so the sprays will form a curtain just above said surface.

References Cited in the file of this patent

UNITED STATES PATENTS

| | | |
|---|---|---|
| 298,101 | Leeds | May 6, 1884 |
| 750,474 | Monjeau | Jan. 26, 1904 |
| 1,574,783 | Beth | Mar. 2, 1926 |
| 1,602,052 | Smith | Oct. 5, 1926 |
| 1,734,011 | Harrison | Oct. 29, 1929 |
| 1,838,475 | Buswell | Dec. 29, 1931 |
| 1,867,512 | Kusch | July 12, 1932 |
| 1,936,308 | Mueller | Nov. 21, 1933 |
| 2,077,907 | Streander | Apr. 20, 1937 |
| 2,195,415 | Lose | Apr. 2, 1940 |
| 2,359,025 | Durdin | Sept. 26, 1944 |
| 2,439,866 | Saladin | Apr. 20, 1948 |
| 2,616,858 | Griffith | Nov. 4, 1952 |
| 2,646,012 | Ingalls | July 21, 1953 |
| 2,775,482 | Schutz | Dec. 25, 1956 |
| 2,775,485 | Miller | Dec. 25, 1956 |
| 2,830,947 | Griffith | Apr. 15, 1958 |

FOREIGN PATENTS

| | | |
|---|---|---|
| 113,002 | Great Britain | Feb. 7, 1918 |